United States Patent [19]

Alexander et al.

[11] Patent Number: 5,166,236
[45] Date of Patent: Nov. 24, 1992

[54] CROSSLINKABLE FLUORO ELASTOMER COMPOSITION

[75] Inventors: James A. Alexander, Golts, Md.;
Paul D. Brothers, Chadds Ford, Pa.;
Philip C. Mazzola, Wilmington, Del.;
Mark A. Stepanek, Newport Beach, Calif.

[73] Assignee: E. I. du Pont de Nemours and Company, Wilmington, Del.

[21] Appl. No.: 623,262

[22] Filed: Dec. 5, 1990

[51] Int. Cl.$^5$ .......................... C08K 5/15; C08K 3/30; C09K 11/06; C09K 11/08
[52] U.S. Cl. ................................. 524/111; 524/107; 524/110; 524/420; 524/434; 524/443; 417/157; 252/301.16
[58] Field of Search ............... 524/420, 107, 110, 111, 524/434, 443; 417/157; 252/301.16

[56] References Cited

U.S. PATENT DOCUMENTS 3,743,833  7/1973  Martic et al. ............... 252/301.4 R

FOREIGN PATENT DOCUMENTS 2627932 12/1977 Fed. Rep. of Germany .
3346915  7/1985 Fed. Rep. of Germany ...... 524/420
0145946 11/1981 Japan ................................. 524/110

Primary Examiner—Paul R. Michl
Assistant Examiner—Peter Szekely

[57] ABSTRACT

An elastomeric composition containing a fugitive tracer compound that fluoresces on exposure to radiation, but which loses its fluorescence during postcuring treating permits monitoring of the completeness of the cure.

19 Claims, No Drawings

CROSSLINKABLE FLUORO ELASTOMER COMPOSITION

BACKGROUND OF THE INVENTION

Elastomers are typically compounded with fillers, crosslinking agents and other additives, followed by forming or shaping into the desired configuration for the article to be made from the elastomer. This forming can be by calendaring or extrusion, but most often is done by compression or injection molding. After shaping, the elastomer molecules are crosslinked by the action of the crosslinking agents to establish a three-dimensional structure that provides strength and form stability. Such crosslinking, or curing, is usually effected by heat and time. An elastomer is often first press-cured at an elevated temperature and pressure when confined in a mold, and then post-cured at elevated temperatures and ambient pressures for an additional period to complete the curing.

Many elastomers can be cured in relatively short periods, while other elastomers, and particularly fluoroelastomers and ethylene/acrylic elastomers, require several hours for full development of the desired mechanical and aging properties of the finished product. Since these properties are dependent on the completion of this curing or postcuring process, techniques have previously been developed to test the degree of curing in an elastomeric composition. Such techniques have heretofore often required time-consuming destructive physical testing of lot samples.

SUMMARY OF THE INVENTION

The present invention provides a quick and simple non-destructive means by which a manufacturer of elastomeric articles can determine whether the article has, in fact, been subjected to the post-curing process. In a preferred embodiment of the present invention, there is further provided a means to identify the origin or manufacturing lot of an elastomeric material by a non-destructive test.

Specifically, the instant invention provides an elastomer composition comprising (a) a crosslinkable elastomeric polymer and (b) about from 0.025 to 3 parts by weight, per hundred parts of the elastomeric polymer, of a fugitive fluorescent compound which is stable at the forming temperature, pressure, and time of the elastomeric polymer, and decomposes or volatilizes from the composition when heated at a temperature of at least about 170° C. for one hour.

The composition preferably further comprises about from 0.05 to 5 parts by weight of an inorganic phosphor that fluoresces at a wavelength which is distinguishable from that of the fluorescent compound and that is stable at a temperature of at least about 170° C. for a period of at least about one hour.

DETAILED DESCRIPTION OF THE INVENTION

A wide variety of crosslinkable elastomeric polymers can be used in the present invention, including those that develop form stability by press-curing or crosslinking in a mold after a period of about 1–60 minutes at temperatures of about 145°–200° C., but which, in order to develop their optimum physical properties, are subjected to a postcure cycle in a circulating air oven at temperatures of about 170°–250° C. for 1–24 hrs.

Representative crosslinkable elastomers which can be used in the present invention include fluoropolymer elastomers comprising copolymerized units of one or more monomers containing fluorine, such as vinylidene fluoride, hexafluoropropylene, pentafluoropropylene, tetrafluoroethylene, chlorotrifluoroethylene, and perfluoro(alkyl vinyl ether), as well as other monomers not containing fluorine, such as propylene. Elastomers of this type are described in Logothetis, Prog. Polym. Sci., Volume 14, pages 251–296 (1989), hereby incorporated by reference.

Representative fluoroelastomers include copolymers of vinylidene fluoride and hexafluoropropylene and, optionally, tetrafluoroethylene; copolymers of tetrafluoroethylene and propylene; and copolymers of tetrafluoroethylene and perfluoro(alkyl vinyl ether), preferably perfluoro(methyl vinyl ether). Each of the above fluoroelastomers can optionally also include a curesite monomer. Copolymers of ethylene, tetrafluoroethylene, perfluoro(alkyl vinyl ether) and a bromine-containing curesite monomer, as described in Moore, U.S. Pat. No. 4,694,045, hereby incorporated by reference, can also be used in the present invention.

Depending on their composition, fluoroelastomers are generally crosslinked by the action of diamines, polyols in conjunction with an accelerator such as a quaternary ammonium or phosphonium compound, or by organic peroxides together with a polyfunctional coagent. Metal oxides or hydroxides and fillers or carbon black are also usually present in the compounded elastomer. Copolymers of tetrafluoroethylene and perfluoro(alkyl vinyl ether) require special cure sites and curing systems as described in Logothetis, U.S. Pat. No. 4,948,853, hereby incorporated by reference.

In the curing of the above fluoroelastomers, the compositions are first cured in a closed mold, or press-cured, and then postcured in an oven in an atmosphere of air or an inert gas. The initial curing is generally for periods of about 1–60 minutes at temperatures of about 145°–205° C., depending on the particular fluoroelastomer composition used. During the initial curing, the fluoroelastomer composition is generally maintained under a pressure in the mold of about from 0 to 3500 MPa. The post cure is typically at ambient pressure, and temperatures of about from 125° to 250° C. for periods of about 1–24 hours.

Other elastomers which can be used in the present invention, and which also require postcure, include ethylene copolymer elastomers such as those described in European Patent Application 329,288. Representative of these elastomers are copolymers of (a) ethylene, (b) an acrylate or methacrylate ester of a lower alkyl alcohol, such as methyl, ethyl, butyl, t-butyl and 2-ethylhexyl alcohols and, optionally, (c) a curesite monomer. The molar ratio of (a) ethylene to (b) acrylate or methacrylate ester is about 50–85:50–15, and preferably about 58–80:42–20. Typical curesite monomers include unsaturated glycidyl esters, such as glycidyl acrylate or methacrylate, unsaturated anhydrides, such as maleic anhydride, and unsaturated compounds having carboxylic groups, such as acrylic acid, methacrylic acid, maleic acid and half esters of maleic acid.

The ethylene copolymer elastomers can be crosslinked by reaction with primary diamines, often in the presence of guanidines to accelerate the cure. Peroxides can also be used, but give inferior properties with some elastomers, and are sometimes used in combination with a diamine cure. As recognized by those skilled in the art, crosslinking is typically accomplished by heating for short periods of time at temperatures of about 160°-180° C. in a closed mold. The resulting products are then usually postcured in an air oven for about 1-24 hours, and preferably 1-8 hours. The postcuring temperatures are generally in the range of about 125°-250° C., and often about 170°-190 C.

The elastomer compositions of the present invention contain about from 0.025 to 3 parts by weight, per hundred parts of the elastomer, of a fugitive fluorescent compound or dye which is insoluble in the crosslinkable elastomer, and is stable at the curing temperature, pressure, and time of the elastomer for a period of at least about 1 hour. The term fugitive refers to a compound which decomposes or volatilizes from the elastomer when heated at a temperature of at least about 170° C. and ambient pressure for more than one hour. Accordingly, the fluorescent compound is stable under the conditions of press cure, but, after the postcure process, is no longer detectable under the conditions first used for its observation. Preferably, the fugitive compound fluoresces in the visible range when exposed to black light.

The specific amount of the fugitive fluorescent compound will vary with the particular elastomer, the intensity with which the dye fluoresces and the concentration of fillers and other additives used. In general, however, about from 0.05 to 0.3 parts, per 100 parts by weight of elastomer, are preferred for the present compositions. In general, it will be desired to use the minimum operable amount of the fugitive compound to avoid unnecessary contamination of operating equipment or other samples by excess fugitive compound on the surfaces of the molded parts. The fugitive fluorescent compound should not react with curing agents present in the elastomer compound, or interfere in any other substantial way with the curing process.

It has been found that during the molding cycles described, in closed molds, at least a portion of the fluorescent compound migrates or exudes to the surface of the molded part, and is thereby concentrated and more readily observable. While a wide variety of fugitive fluorescent compounds can be used, those that are visible under black or ultraviolet light have been found particularly convenient, and are accordingly preferred.

It is also preferred that the fugitive fluorescent compound be insoluble in the elastomer, to facilitate the exuding or blooming of the fugitive compound to the surface of the molded article. In addition, the compound should degrade or volatilize from the elastomer under the conditions of the postcure treatment, so that its identifying fluorescence is no longer detectable under the conditions first used for its observation.

A wide variety of fugitive fluorescent compounds can be used in the present compositions. Recognized classes of such compounds which can be used include coumarin, xanthene, methine, napthalimide, anthraquinone, and stilbene derivatives, as well as heterocyclic compounds containing one or more of nitrogen, oxygen and sulfur atoms. Coumarin dyes and sulfur heterocyclic compounds such as thiophenes and thiophene derivatives are preferred. Other heterocyclic compounds which can be used include benzoxazole and benzopyranone. 7-diethylamino-4-methylcoumarin has been found to be particularly satisfactory.

The compositions of the present invention preferably further comprise an inorganic phosphor that fluoresces at a wavelength which is distinguishable from that of the fugitive fluorescent compound, and that is non-fugitive under postcuring conditions used for the elastomer. Preferably, the inorganic phosphor fluoresces when activated by ultraviolet light. It is also preferred that the phosphor fluoresce in the visible spectrum. The effective amount of the phosphor will, of course, vary with the particular phosphor used, but will generally be about from 0.05 to 5 parts, and especially about 1-2.5 parts, per 100 parts of elastomer. The phosphor should be substantially uniformly distributed throughout the elastomer.

Since the phosphor is finely dispersed in the matrix, it does not migrate to the surface or interfere with the detection of the fluorescent organic fugitive fluorescent compound at the surface. Although the phosphors can be detected by examination of molded surfaces, their presence is most readily detected in the interior of the sample when a freshly cut surface is observed under black light. Detection of a particular phosphor color thereby serves as a convenient method for identifying a particular elastomer as to source, production lot or other history. It has also been found that the inorganic phosphors, after postcure, readily reveal the presence of flaws on the surfaces of molded articles as regions of more intense fluorescence under black light. Such flaws are often not easily observed under ordinary visual examination, and use of the phosphor thus serves as an improved quality control sensor for demanding applications.

Phosphors which can be used in the present invention include those that are commonly used for manufacture of cathode-ray tubes, fluorescent lights photocopier lamps, x-ray intensifying screens and the like. Their utility is a function of the relative brightness of the phosphor, and it is desirable that, when activated by long wave radiation, they emit at least 50% of the absorbed radiation. Representative of the many known phosphors which can be used are those classified by the Joint Electronic Device Engineering Council (JEDEC) under classifications P-4, P-15, P-22, and P-43. The phosphors generally comprise an activator. Representative phosphors and preferred activators are summarized in the following Table.

| Phosphor | Activator | Color |
| --- | --- | --- |
| (Zn,Cd)S | Ag | yellow |
| ZnS | Ag | blue |
| ZnO | Zn | green |
| $Y_2O_2S$ | Eu | red |
| $Gd_2O_2S$ | Tb | green |
| $CaWO_4$ | Pb | blue |
| $BaMg_2Al_{16}O_{27}$ | Eu | blue |
| $Ca_5F(PO_4)_3$ | Sb:Mn | yellow |
| $Gd_2O_2S$ | Tb | green |
| (Zn,Cd)S | Cu:Al | green |
| (blend) ZnS | Ag | white |
| (Zn,Cd)S | Cu:Al | |
| ZnS | Cu:Al | green |
| $Zn_2SiO_4$ | Mn | green |
| $Y_2O_3$ | Eu | red |
| $Mg_4(F)GeO_6$ | Mn | red |
| $CaSiO_3$ | Pb:Mn | orange |
| $Y_3Al_5O_{12}$ | Ce | yellow |
| $Sr_3(PO_4)_2$ | Eu | blue |
| $Ba_3(PO_4)_2$ | Eu | blue |

Preferred phosphors are ZnS:Cu:Al (green) and ZnS:Ag (blue).

Fluroescence due to either the fugitive fluorescent compound (before postcure processes) or the inorganic phosphor can be observed on exposure of the molded specimens to ultraviolet radiation at frequencies near the peak excitation range of the fluorescing substrate, typically 200–400 nm. For reasons of eye safety, however, it is desirable to use radiation having a wavelength of about from 365 to 400 nm. Such radiation is alternatively referred to as long wave ultraviolet or black light. Sources of such radiation having intensities of at least about 600 $\mu W/cm^2$ are preferred and are readily available commercially. For ease of observation, it is expedient to carry out the observation in a darkened area, most preferably in a totally enclosed and darkened housing.

The compositions of this invention can be prepared by known mixing procedures for compounding the elastomers with crosslinking agents, fillers, pigments and reinforcing agents, processing aids, antioxidants and the like. For example, high shear mixing devices such as Banbury internal mixers, mixing extruders, or two-roll rubber mills can be used to intimately disperse the fluorescent dye and inorganic phosphor at moderately elevated temperatures, e.g., 90°–120° C. or below for a few minutes, e.g., 2–6 minutes.

Either or both of the fugitive compound and phosphor can be added, if desired, as a concentrate in a carrier that does not interfere with the cure of the elastomer. If used, the carrier is preferably a polymeric carrier, and especially one that is compatible with the elastomer. A polymeric carrier that will be the elastomer of the composition is particularly desirable.

The fugitive fluorescent compound and phosphor of the invention can be added at a time prior to, subsequent to or simultaneously with mixing of the normal curatives, fillers, process aids, antioxidants or other adjuvants commonly used with the elastomers of the invention. However, to minimize any potential interaction between the fugitive fluorescent compound and polymer curatives, it may in some instances be advantageous to add the fugitive compound after the curatives are fully dispersed and diluted.

When the compositions of the present invention are heated in a closed mold for short periods of time, the fluorescent compound often exudes to the surface of the molded article, where it is more readily visible in black light. In further, long term heating outside the mold, the fluorescent compound or dye either degrades chemically, or volatilizes from the elastomer under the the conditions of post-cure so that it is no longer detectable under black light, thus verifying the postcure treatment. After the fluorescence of this component has been lost, then the identifying fluorescence of the inorganic phosphor, if present, can be readily observed.

The present invention is more fully illustrated in the following examples, in which Fluoroelastomer A was a composition containing 97.5 parts of a copolymer having a nominal composition of 60 wt % vinylidene fluoride and 40 wt % hexafluoropropylene, having a Mooney viscosity at 121° C. of 60 and containing blended therein 2.5 parts of a 1:1 salt obtained by reacting benzyltriphenylphosphonium chloride and 4,4'-hexafluoroisopropylidene diphenol.

Fluoroelastomer B had a nominal composition of 60 wt % vinylidene fluoride and 40 wt % hexafluoropropylene and had a Mooney Viscosity of 60 at 100° C.

Fluoroelastomer C had a nominal composition 34 wt % vinylidene fluoride, 38 wt % perfluoro(methyl vinyl ether) 26 wt % tetrafluoroethylene and a small amount of a bromine-containing curesite monomer for peroxide cure. Fluoroelastomer C had a Mooney viscosity of 65 at 121° C.

The ethylene/acrylic copolymer had a nominal composition of 41 wt % ethylene, 55 wt % methyl acrylate and 4 wt % of a curesite monomer and had a Mooney Viscosity of 16 at 100° C.

All of these polymers, when cured by typical recipes in commercial use, had physical properties that were not substantially changed by incorporation of the fugitive fluorescent dyes or inorganic phosphors as described hereinbelow.

Two sources of long wave radiation were used for the detection of fluorescent material. Both were obtained from UV Products, Inc. Black Light #1 (BL-1) was Model UVGL-58 (6 watt), emitted with an intensity of 600 $\mu W/cm^2$ at a wavelength of 365 nm. and was used with a CC-10 housing. Black Light #2 (BL-2) was Model B-100A, gave 7000 $\mu W/cm^2$ of long wave radiation and was also used in a darkened enclosure for sample viewing.

All inorganic phosphors were obtained from GTE Products Corporation, Towanda Pa.

EXAMPLE 1

Fluoroelastomer A was mixed on a cold mill with 3 parts per hundred of rubber (phr) of magnesium oxide (Maglite D), 6 phr of calcium hydroxide, 30 phr of N990 "MT" carbon black and 0.3 phr of an organic fluorescent dye. The dye is commercially available from Day-Glo Color Corporation as Columbia Blue, and was identified as 7-diethylamino-4-methylcoumarin. O-ring specimens having an outer diameter of 2.54 cm. and a thickness of 0.353 cm were compression molded in a press for 5 min at 177° C. and then unloaded while still hot. After cooling the specimens were examined using BL-1 and were found to have a highly visible blue fluorescent coating but were black in the absence of UV light. The specimens were then postcured in a circulating air oven for 24 hours at 232° C. They were again examined under BL-1 and were found to have no significant blue fluorescence on the surface.

EXAMPLE 2

Fluoroelastomer A was compounded with curatives as described in Example 1, and in addition, contained 1 phr of Columbia Blue and 2.5 phr of a ZnS phosphor, activated with copper and aluminum (JEDEC No. P-22 Green). After press cure as in Example 1, the specimens had a bright fluorescent blue color when examined under BL-1. After postcure for 24 hours at 232° C., the surfaces had a dull green fluorescence. When the o-rings were cut and a fresh surface examined under BL-1 they exhibited the brighter fluorescent green color of the phosphor.

EXAMPLES 3–6

Fluoroelastomer A was compounded with curatives as in Example 1, and additionally contained 2.5 phr of ZnS:Cu:Al phosphor. Examples 3–6 further contained 0.025, 0.05, 0.1 and 0.3 phr Columbia Blue dye, respectively. After press cure as in Example 1, blue fluorescence on the surfaces was easily discerned under BL-1 for Examples 4–6, and was faintly visible for Example 3. After postcure there was no visible blue fluorescence on the o-ring surfaces, and a green fluorescence was readily visible.

EXAMPLE 7

Fluoroelastomer A compounded with curatives as in Example 1 and containing 0.05 phr of Columbia Blue was press cured into o-rings for the following cycles: 30 min/148° C., 10 min/177° C. and 30 min/162° C. After removal from the press and examination under BL-2 all samples showed the blue fluorescence of the dye on the surface.

EXAMPLE 8

Fluoroelastomer B was compounded with 1.5 phr hexamethylenediamine carbamate, 20 phr MT black, 15 phr magnesium oxide (Maglite Y), 0.05 phr Columbia Blue dye and 2.5 phr ZnS:Cu:Al phosphor and o-rings press cured and postcured as described in Example 1. Under BL-2 the blue fluorescence of the dye was readily observed after press cure, but not after postcure. The phosphor was readily observable under the black light at all stages of processing.

EXAMPLE 9

Fluoroelastomer C was compounded with 30 phr MT black, 3 phr each of litharge, 2,5-dimethyl-2,5-bis-(t-butylperoxy)hexyne-3 (45% on calcium carbonate) and triallyl isocyanurate, 0.05 phr Columbia Blue dye, and 2.5 phr $Mg_4(F)GeO_6$:Mn phosphor (red, Type 236 from GTE) and o-rings were then press cured and postcured as in Example I. Under BL-2, after press cure, the typical blue color of the dye was observed and after postcure only the red color of the phosphor was observable, especially on a freshly cut surface.

EXAMPLE 10

Fluoroelastomer A was compounded with curatives as in Example 1. To each of five equal aliquots was added 0.1, 0.5, 1, 1.5, and 2 phr, respectively, of ZnS:Cu:Al phosphor. The phosphor was green Type 1260 from GTE. O-rings were presscured and postcured as in Example 1 and viewed under BL-2. With the higher power of BL-2, 1.5 parts of phosphor 1260 could easily be seen, and levels as low as 0.5 phr of the phosphor could also be seen but appeared less uniform.

EXAMPLE 11

Ethylene/acrylic elastomer was compounded on a cold mill with the following ingredients: 55 phr SRF black, 1.25 phr hexamethylenediamine carbamate, 4 phr di-o-tolylguamidine (DOTG), 2 phr 4,4'-di(a,a-dimethylbenzyl) diphenylamine antioxidant (Naugard 445), 0.5 phr complex organic ester free acid (Vanfree VAN), 0.5 phr octadecyl amine crosslinking agent and 0.05 phr Columbia Blue fluorescent dye and 2.5 phr of ZnS:Cu:Al phosphor. Slab specimens, 1.6 mm (1/16 inch) thick were cured in a press for 10 min at 180° C. and then postcured for 4 hours at 180° C. The blue surface color of the dye was observable under BL-2 after press cure and the green color of the phosphor was slightly visible after post cure.

EXAMPLES 12-21

Compounds were prepared as in Example 2, except that the phosphor concentration was 1.5 phr, using 0.2 phr of the fluorescent organic compounds or dyes listed in the Table. The dyes for Examples 12-17 were obtained from Aakash Chemicals & Dye-Stuffs, Inc., while the dyes for Examples 18-21 were obtained from Keystone Aniline Corp. O-rings were molded as in Example 1 except that pressing time was 10 minutes. After cooling, the o-rings were examined under black light and all were found to fluoresce in a color which is characteristic of each dye and not necessarily the color in its identification. After postcure as in Example 1, the o-rings all fluoresced in the green which is characteristic of the phosphor.

TABLE

| Ex. | Supplier's Identification | Chemical Name or Description |
|---|---|---|
| 12 | Acid Red 52 | Rhodamine B (a xanthene dye) |
| 13 | Basic Yellow 40 | coumarin dye |
| 14 | Disperse Yellow 82 | methine dye |
| 15 | Disperse Yellow 184 | napthalimide dye |
| 16 | Solvent Yellow 43 | anthraquinone dye |
| 17 | Solvent Yellow 44 | napthalimide dye |
| 18 | Keyfluor White PL | benzoxazole (a nitrogen/oxygen heterocyclic dye) |
| 19 | Keyfluor White CXDP | oxazinone derivative (a mixed heterocyclic dye) |
| 20 | Keyfluor White ST | triazinyl stilbene derivative |
| 21 | Keyfluor White RWP | Benzopyranone brightener |

EXAMPLES 22-24

Compounds were prepared as in Example 1 except that three different fluorescent dyes obtained from Aldrich Chemical Co., Inc. were used at the 0.1 phr level instead of the Columbia Blue. O-rings were molded as in Examples 12-21. The o-rings of Examples 22 and 23 fluoresced in different shades of blue. After postcure as in Example 1, fluorescence was not discernible. Fluorescence could not be detected for the o-rings of Example 24. However, when the dye concentration was increased to 0.2 phr, light blue fluorescence was observed. The fluorescence vanished with postcure. This illustrates that the minimum effective dye concentration will vary with the dye.

| Ex. | Supplier's Code | Chemical Name or Description |
|---|---|---|
| 22 | D8,775-9 | 7-diethylamino-4-methylcoumarin |
| 23 | 22,399-9 | 2,5-bis(5-tert-butyl-2-benzoxazolyl)thiophene |
| 24 | 29,418-7 | 4,4'-diamino-2,2'-stilbene sulfonic acid |

EXAMPLE 25

The fluorescent dye of Example 21 was incorporated at a concentration of 0.2 phr in compounds as in Examples 1 and 2, except that the phosphor was used at the 1.5 phr level. After molding, o-rings exhibited a bright blue fluorescence in both cases. When cut, the interior of the o-ring without phosphor fluoresced blue while the interior of the o-ring with phosphor fluoresced green. This is interpreted to indicate migration of the dye toward the surface, reducing the dye concentration in the interior. After postcure, there was no dye fluorescence either on exterior or exposed interior surfaces, with or without phosphor.

EXAMPLE 26

The compound of Example 2 was prepared except that the phosphor concentration was 1.5 phr and the Columbia Blue dye concentration was 0.002 phr, achieved by using an extended dye preparation from Day-Glo Color Corporation called Invisible Blue. Fluorescence was not detected on o-rings molded from this compound.

EXAMPLE 27

Compounds were prepared as in Example 2 except that the dye concentration was 0.05 phr and the phosphor concentration was 1.5 phr. After molding, o-rings exhibited the characteristic fluorescence of the dye. O-rings were placed in curing ovens at various temperatures and the disappearance of the dye fluorescence was monitored. At 232° C. and 204° C., the blue fluorescence was nearly gone in 20 minutes. At 177° C., the blue fluorescence was nearly gone in 2 hours. At 121° C., there were still traces of blue fluorescence after 23 hours. This illustrates the time-temperature dependence for elimination of the tracer dye fluorescence.

We claim:

1. An fluoroelastomer composition comprising
   (a) a crosslinkable fluoroelastomeric polymer and
   (b) about from 0.025 to 3 parts by weight, per hundred parts of the fluoroelastomeric polymer, of a fugitive fluorescent compound which is stable at the forming temperature, pressure and time of the fluoroelastomeric polymer, and decomposes or volatilizes from the composition when heated at a temperature of at least about 170° C. and ambient pressure for more than one hour.

2. A composition of claim 1 further comprising about from 0.05 to 5 parts by weight of an inorganic phosphor that fluoresces at a wavelength which is distinguishable from that of the fugitive fluorescent compound and is stable at a temperature of at least about 170° C. for a period of at least about one hour.

3. A composition of claim 1 wherein the fugitive fluorescent compound is organic.

4. A composition of claim 3 wherein the fugitive fluorescent compound is substantially insoluble in the crosslinkable elastomeric polymer.

5. A composition of claim 1 wherein the fugitive fluorescent compound is stable at the forming temperature and pressure of the elastomeric polymer for a period of at least about 1 hour.

6. A composition of claim 1 wherein the fugitive fluorescent compound is present in an amount of about from 0.05 to 0.3 parts by weight.

7. A composition of claim 2 wherein the inorganic phosphor is present in an amount of about from 1 to 2.5 parts by weight.

8. A composition of claim 1 wherein the fugitive fluorescent compound fluoresces in the visible range on exposure to ultraviolet light.

9. A composition of claim 2 wherein the inorganic phosphor fluoresces in the visible range on exposure to ultraviolet light.

10. A composition of claim 3 wherein the fugitive fluorescent organic compound is a coumarin.

11. A composition of claim 10 wherein the fugitive fluorescent organic compound consists essentially of 7-diethylamino-4-methylcoumarin.

12. A composition of claim 3 wherein the fluorescent compound is a sulfur heterocyclic compound.

13. A composition of claim 12 wherein the fluorescent compound consists essentially of a thiophene.

14. A composition of claim 2 wherein the inorganic phosphor, when activated by long wave radiation, emits at least about 50% of the absorbed radiation.

15. A composition of claim 2 wherein the inorganic phosphor is selected from the group consisting of ZnS, $Zn_2SiO_4$, and $Mg_4FGeO_6$.

16. A composition of claim 15 wherein the inorganic phosphor consists essentially of ZnS.

17. A composition of claim 16 wherein the ZnS is activated with copper and aluminum.

18. A composition of claim 16 wherein the ZnS is activated with silver.

19. A composition of claim 1 wherein the elastomeric polymer is a perfluoroelastomer.

* * * * *